United States Patent
Mamiya (10) Patent No.: US 7,869,322 B2
(45) Date of Patent: Jan. 11, 2011

(54) OPTICAL DISC DEVICE AND DISC REPRODUCING METHOD

(75) Inventor: Noboru Mamiya, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 838 days.

(21) Appl. No.: 11/415,159

(22) Filed: May 2, 2006

(65) Prior Publication Data
US 2006/0256680 A1 Nov. 16, 2006

(30) Foreign Application Priority Data
May 10, 2005 (JP) ............... 2005-137938

(51) Int. Cl.
*G11B 7/20* (2006.01)
(52) U.S. Cl. ................... 369/53.22; 369/94
(58) Field of Classification Search .......... 369/94, 369/47.5, 53.21, 13.39, 13.4, 13.53
See application file for complete search history.

(56) References Cited

U.S. PATENT DOCUMENTS 6,320,840 B1* 11/2001 Oh et al. ................. 369/286
6,373,807 B1* 4/2002 Ohtaki et al. ............ 369/112.01
6,469,965 B1* 10/2002 Horita ..................... 369/53.2
7,355,944 B2* 4/2008 van de Grampel et al. . 369/53.1
2005/0117465 A1* 6/2005 Kishimoto et al. ....... 369/30.27

FOREIGN PATENT DOCUMENTS

JP 2003-346348 12/2003

* cited by examiner

*Primary Examiner*—Wayne R Young
*Assistant Examiner*—Aneeta Yodichkas
(74) *Attorney, Agent, or Firm*—McDermott Will & Emery LLP (57) ABSTRACT

The first layer (DVD layer) is first reproduced using the red layer light. Thereafter, search for the second layer (HDDVD layer) is performed with the blue laser light in accordance with the reproducing operation being temporarily interrupted for menu display (display for chapter or language selection). If the second layer is detected, a display indicating that the second layer can be selected is displayed over the menu display. If instruction to reproduce the second layer is input from the user according to the display, the reproducing operation of the first layer using the red laser light is switched to the reproducing operation of the second layer (HDDVD layer) using the blue laser light.

6 Claims, 8 Drawing Sheets

OPTICAL DISC DEVICE AND DISC REPRODUCING METHOD

This application claims priority under 35 U.S.C. §119 of Japanese Patent Application No. 2005-137938 filed May 10, 2005.

BACKGROUND OF THE INVENTION

1. Field of the Invention

The present invention relates to an optical disc device capable of reproducing a two-wavelength two-layer disc configured by a first recording layer responding to a laser light of a first wavelength and a second recording layer responding to a laser light of a second wavelength longer than the first wavelength arranged in sequence from the back side when seen from the laser light entering side and so that the first recording layer is not optically detected when the laser light of the second wavelength is used; and a disc determining method suitably used for such a device.

2. Description of the Related Art

Presently, standardization of the next generation DVD (Digital Versatile Disc) using a blue laser light having a wavelength of about 405 nm is being forwarded. In such standardization, consideration is made on arranging two recording layers for the blue laser light (hereinafter referred to as "HDDVD layer") in the direction of the disc thickness. Further, consideration is made on arranging the HDDVD layer and the recording layer for the red laser light (hereinafter referred to as "DVD layer") in the direction of the disc thickness.

In the next generation DVD (hereinafter referred to as "hybrid HDDVD") in which the HDDVD layer and the DVD layer are arranged in the direction of disc thickness, the DVD layer is arranged on the near side and the HDDVD layer is arranged on the back side when seen from the laser light entering side. The HDDVD layer is formed with a material that cannot be optically detected by the red laser light. Further, the same format as that for the existing DVD is applied to the DVD layer.

Japanese Laid-Open Patent Publication No. 2003-346348 discloses an optical disc including two recording layers and a driving device thereof.

Since the DVD layer in the hybrid HDDVD has the same format as the existing DVD, as described above, reading of data is performed as if a DVD were loaded when the drawing operation during recordation/reproduction is performed from the DVD layer on the near side. Since information indicating that the HDDVD layer additionally exists is not recorded on the DVD layer, the hybrid HDDVD cannot be appropriately determined only from the data read from the disc at the driving side. Thus, the optical disc device requires a means for making an appropriate determination when the hybrid HDDVD is loaded.

However, since the HDDVD layer is not optically detected by the red laser light, as mentioned above, it is difficult to determine the hybrid HDDVD using the red laser light. Although the blue laser light is preferably used for disc determination, the red laser light used for DVD is preferably set as the priority laser light in reproduction rather than the blue laser light taking into account that DVDs are already commercialized, so that a rapid transition to the reproducing operation is achieved when the DVD is loaded.

SUMMARY OF THE INVENTION

The present invention aims to provide an optical disc device that achieves smooth disc determination and rapid transition to the reproducing operation while setting the red laser light as the priority laser light in reproduction; and a disc reproducing method.

A first aspect to the present invention relates to an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the optical disc device including an optical pickup for irradiating the laser light of the first or the second wavelength onto a disc loaded on the optical disc device; a laser drive circuit for setting the laser light irradiated onto the disc to a laser light of either the first or the second wavelength; a reproduction circuit for reproducing a signal from the optical pickup; an output circuit for generating an output signal to provide predetermined information to a user; and a control circuit for controlling the laser drive circuit, the reproduction circuit, and the output circuit; wherein the control circuit performs a controlling process for reproducing a recording layer of the disc that appears first when seen from the laser light entering side using the laser light of the second wavelength when the disc is loaded on the optical disc device; a controlling process for searching for whether or not another recording layer is present at the back of the recording layer being reproduced when seen from the laser light entering side with the laser light switched from the laser light of the second wavelength to the laser light of the first wavelength using an available time in the reproducing operation; and a controlling process for generating an output signal to notify the user of the detection when another recording layer is detected in the search.

The optical pickup in the first aspect is embodied by an optical pickup 101 in the following embodiment.

The laser drive circuit in the first aspect is embodied by a laser drive circuit 104 in the following embodiment.

The reproduction circuit in the first aspect is embodied by a signal processing circuit 102 and a demodulation circuit 105 in the following embodiment.

The output circuit in the first aspect is embodied by an AV processing circuit 108 in the following embodiment.

The control circuit in the first aspect is embodied by a controller 106 in the following embodiment.

The second aspect of the present invention relates to a disc reproducing method in an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the method including the steps of reproducing a recording layer that appears first when seen from the laser light entering side using the laser light of the second wavelength when a disc is loaded on the optical disc device; searching whether or not another recording layer is present at the back of the recording layer being reproduced when seen from the laser light entering side with the laser light switched from the laser light of the second wavelength to the laser light of the first wavelength using an available time in the reproducing operation in the reproducing step; and generating an output signal for notifying the user of the detection when another recording layer is detected in the searching step.

Figure 3:
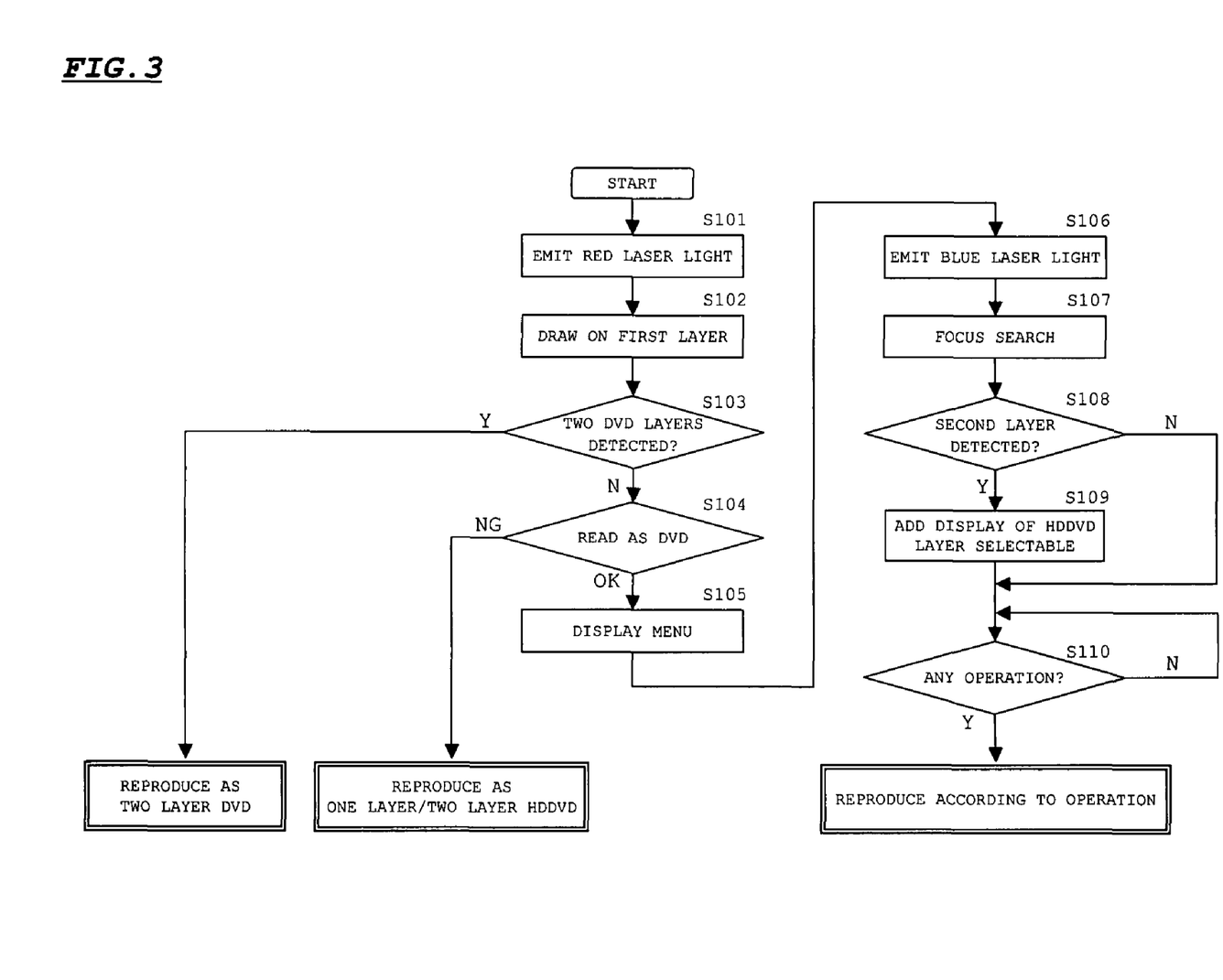
FIG. 3 is a process flowchart in disc reproduction according to the embodiment of the present invention.
Figure 4:
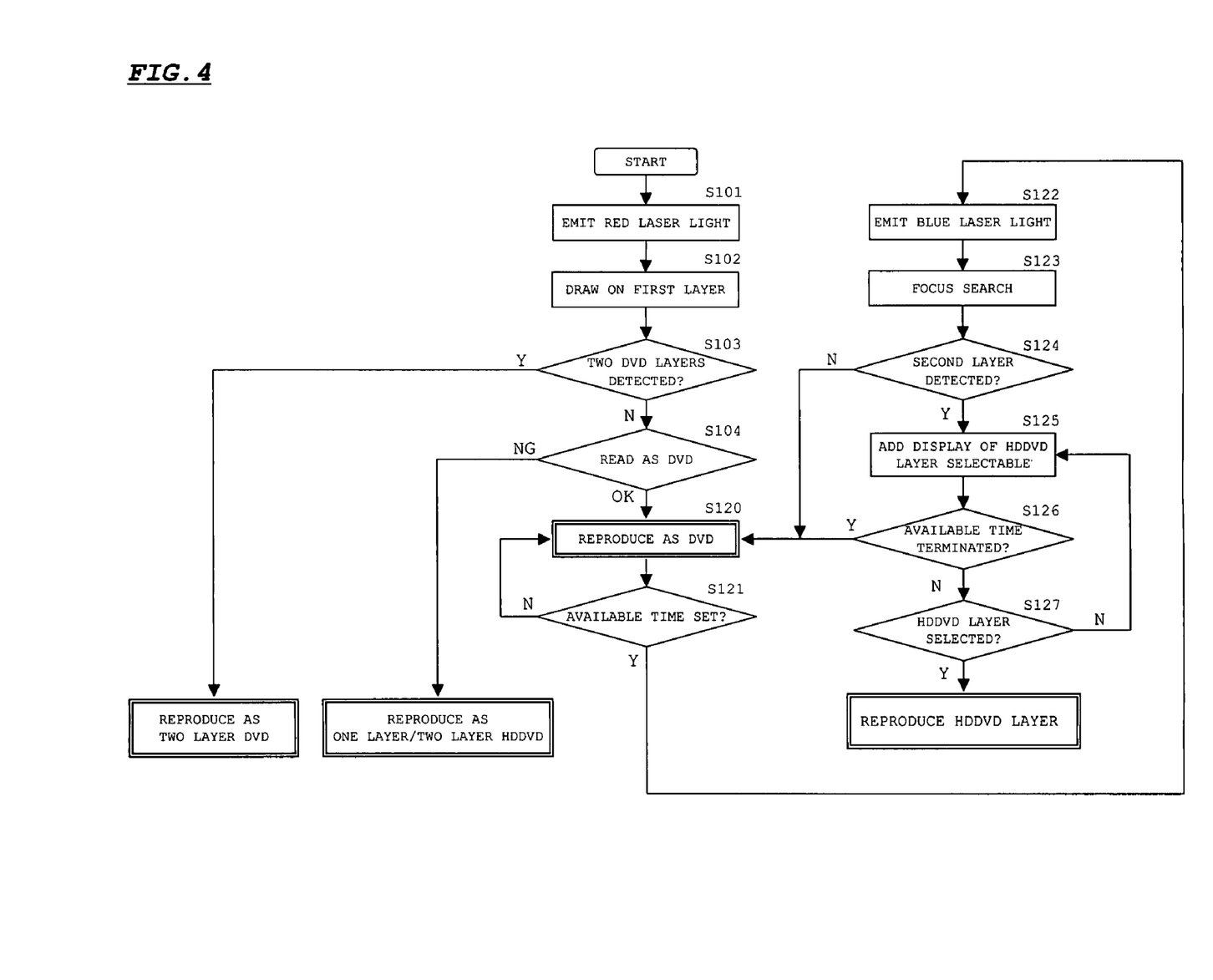
FIG. 4 is a variant of the process flowchart in disc reproduction according to the embodiment of the present invention.
Figure 5:
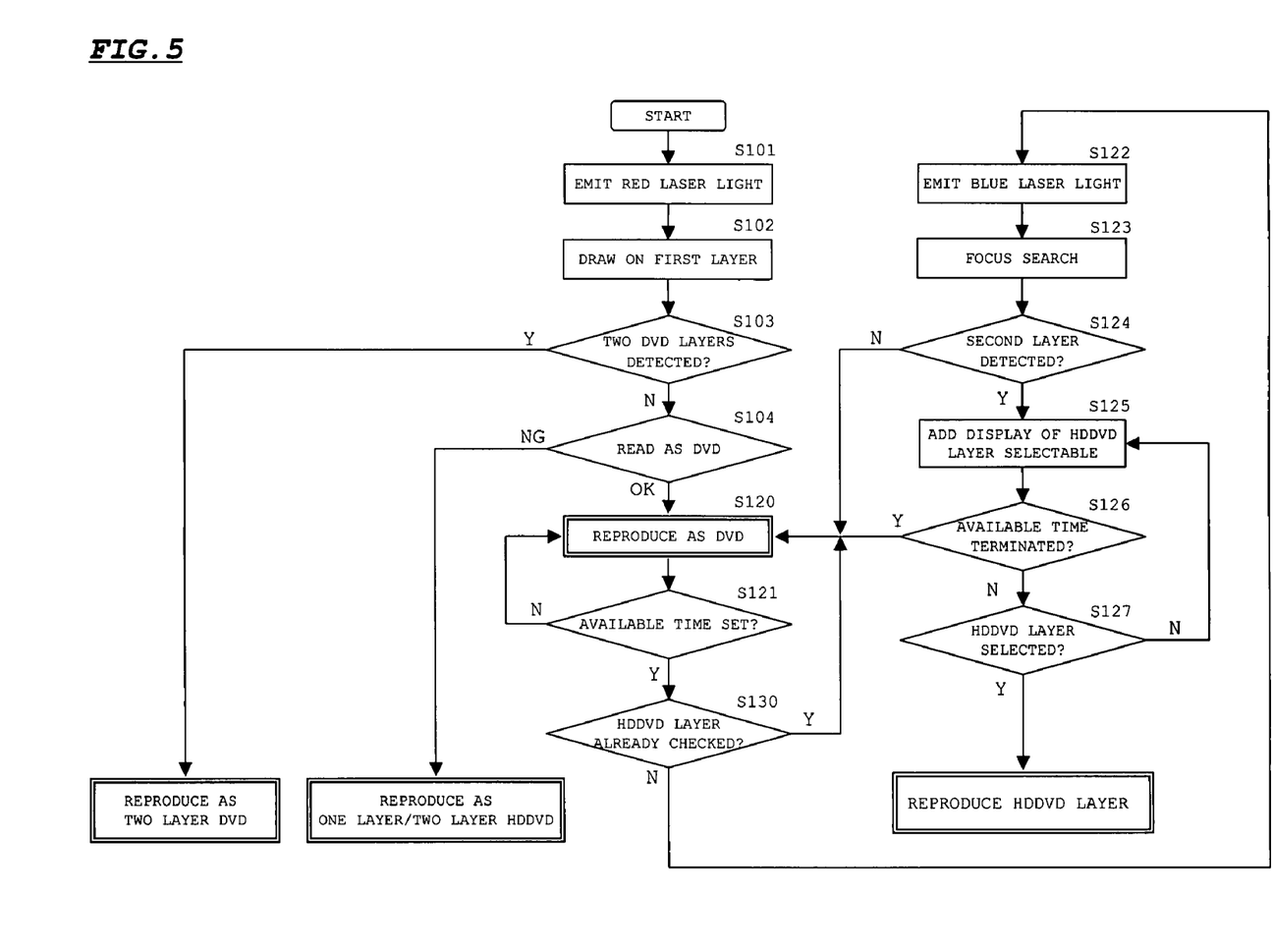
FIG. 5 is a variant of the process flowchart in disc reproduction according to the embodiment of the present invention.
Figure 6:
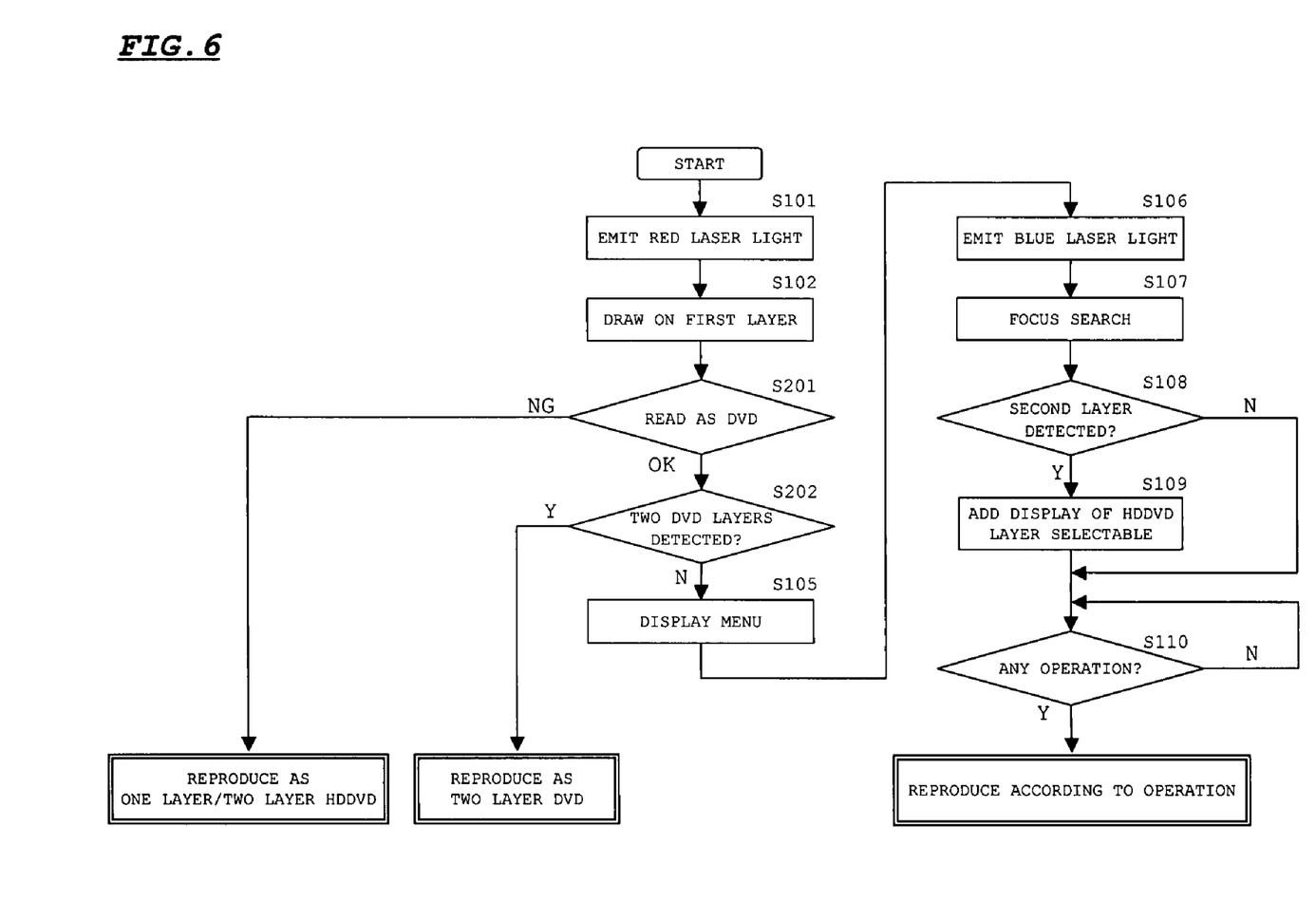
FIG. 6 is a variant of the process flowchart in disc reproduction according to the embodiment of the present invention.
Figure 7:
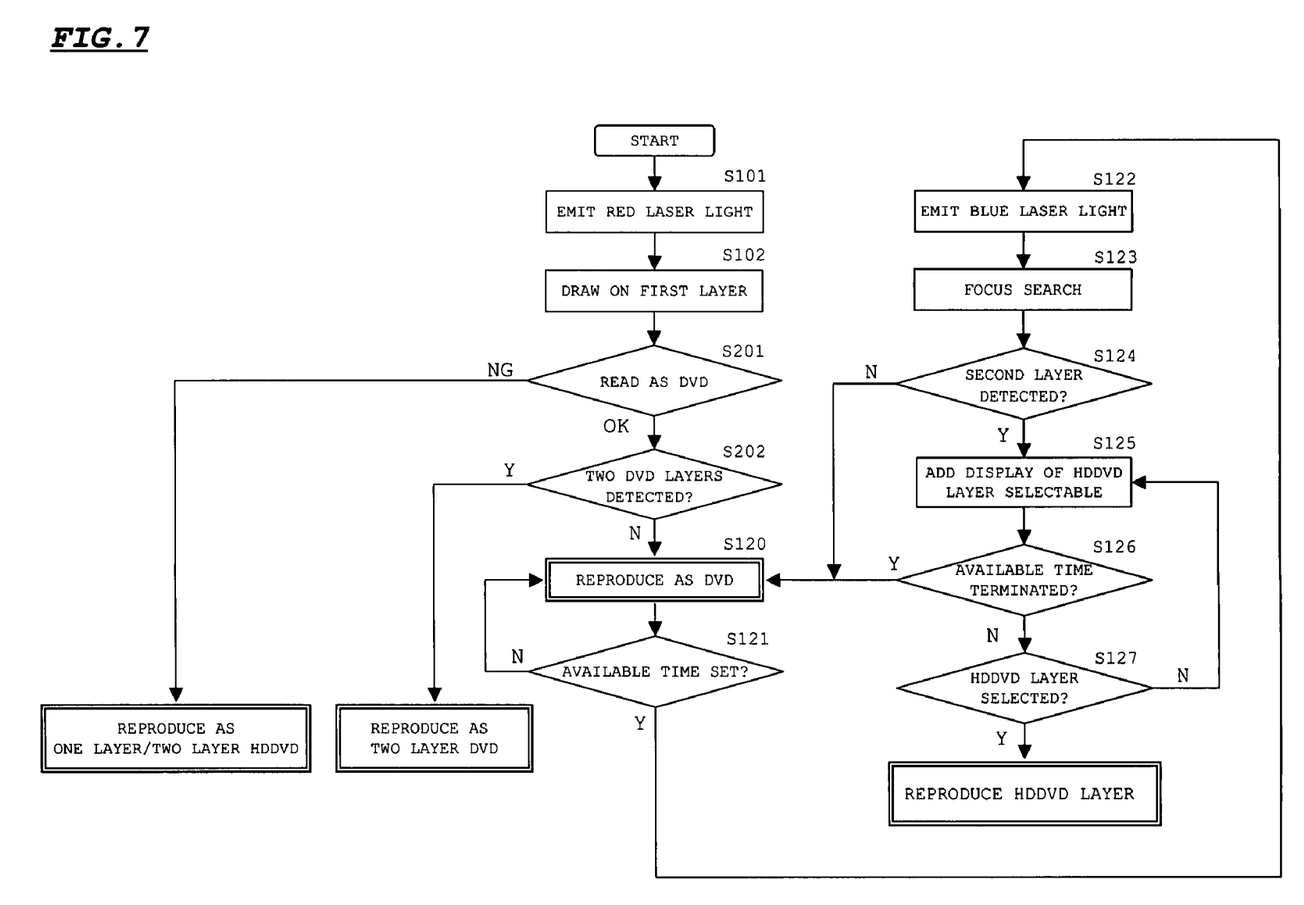
FIG. 7 is a variant of the process flowchart in disc reproduction according to the embodiment of the present invention.
Figure 8:
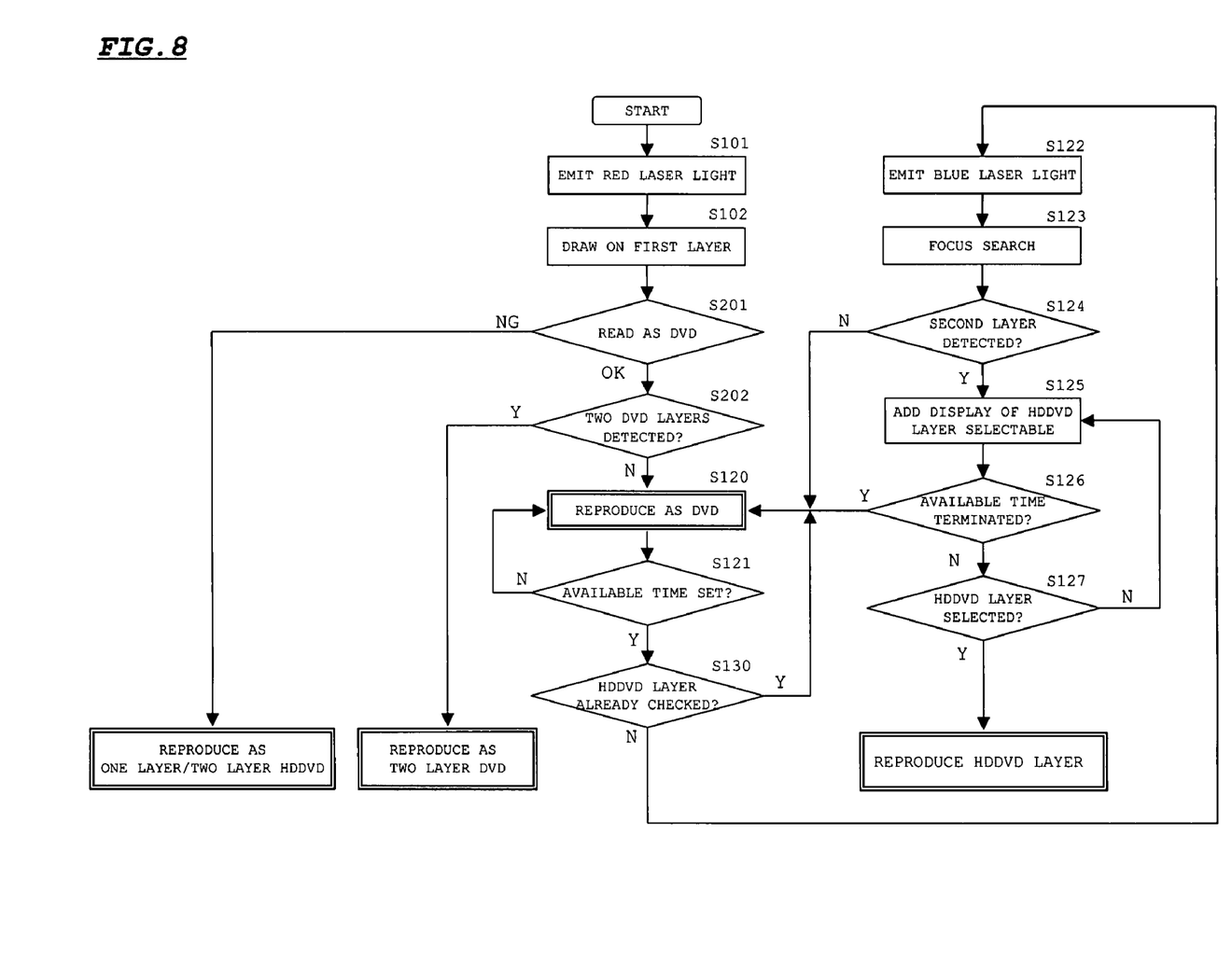
FIG. 8 is a variant of the process flowchart in disc reproduction according to the embodiment of the present invention.

The reproducing step in the second aspect corresponds to steps S101 to S105 in the flowchart of FIG. 3, corresponds to steps S101 to S104 and step S120 in the flowchart of FIG. 4 and FIG. 5, corresponds to steps S101, S102, S201, S202 and S105 in the flowchart of FIG. 6, and corresponds to steps S101, 102, S201, S202 and S120 in the flowchart of FIG. 7 and FIG. 8.

The searching step in the second aspect corresponds to steps S106 to S108 in the flowchart of FIG. 3 and FIG. 6, corresponds to steps S121 to S124 in the flowchart of FIG. 4 and FIG. 7, and corresponds to steps S121 and S130, and steps S122 to S124 in the flowchart of FIG. 5 and FIG. 8.

The output generating step in the second aspect corresponds to step S109 in the flowchart of FIG. 3 and FIG. 6, and corresponds to step S125 in the flowchart of FIG. 4, FIG. 5, FIG. 7 and FIG. 8.

A third aspect of the present invention relates to a disc reproducing method in an optical disc device capable of reproducing a two-wavelength two-layer disc configured by a first recording layer corresponding to a laser light of a first wavelength and a second recording layer corresponding to a laser light of a second wavelength longer than the first wavelength, the first and second recording layers being arranged in sequence from the back side when seen from a laser light entering side, and the first recording layer being not optically detected when the laser light of the second wavelength is used; the method including the steps of reproduction trial for carrying out reproduction trial on a recording layer that appears first when seen from the laser light entering side using the laser light of the second wavelength when a disc is loaded on the optical disc device; reproducing for continuing the reproducing operation when reproduced in the reproduction trial step; searching whether or not another recording layer is present at the back of the recording layer being reproduced when seen from the laser light entering side with the laser light switched from the laser light of the second wavelength to the laser light of the first wavelength using an available time in the reproducing operation in the reproducing step; and output generating for generating an output signal for notifying the user of the detection when another recording layer is detected in the searching step.

The reproduction trial step in the second aspect corresponds to steps S101 to S104 in the flowchart of FIG. 3, FIG. 4 and FIG. 5, and corresponds to steps S101, S102, S201, and S202 in the flowchart of FIG. 6, FIG. 7 and FIG. 8.

The reproducing step in the second aspect corresponds to step S105 in the flowchart of FIG. 3 and FIG. 6, corresponds to steps S120 and S121 in the flowchart of FIG. 4, FIG. 5, FIG. 7 and FIG. 8.

The searching step in the second aspect corresponds to steps S106 to S108 in the flowchart of FIG. 3 and FIG. 6, corresponds to steps S121 to S124 in the flowchart of FIG. 4 and FIG. 7, and corresponds to steps S121 and S130, and steps S122 to S124 in the flowchart of FIG. 5 and FIG. 8.

The output generating step in the second aspect corresponds to steps S109 in the flowchart of FIG. 3 and FIG. 6, and corresponds to step S125 in the flowchart of FIG. 4, FIG. 5, FIG. 7 and FIG. 8.

According to each aspect, the recording layer that appears first when seen from the laser light entering side is reproduced with the laser light of the second wavelength. Thus, even if the disc loaded on the optical disc device is of a type in which only one recording layer responding to the laser light of the second wavelength is arranged, a rapid transition to the reproducing operation can be performed.

Moreover, if the loaded disc is a two-wavelength two-layer disc, presence of the other recording layer at the back of the recording layer currently being reproduced when seen from the laser light entering side is detected using an available time in the reproducing operation such as menu display period or pause period and the like, and such detection is notified to the user. Thus, the presence of a recording layer different from the recording layer currently being reproduced is smoothly notified to the user even if the two-wavelength two-layer disc is loaded.

BRIEF DESCRIPTION OF THE DRAWINGS

The invention, together with objects and advantages thereof, may best be understood by reference to the following description of the presently preferred embodiments together with the accompanying drawings in which.

It should be noted that the drawings are merely provided for explanation purpose and should not be considered as limiting the scope of the invention in any way.

DESCRIPTION OF THE PREFERRED EMBODIMENTS

The embodiments of the present invention will now be described with reference to the drawings.

In the present embodiment, the present invention is applied to a compatible optical disc device that can respond to a DVD in which only one DVD layer is arranged (hereinafter referred to as "one layer DVD"); a DVD in which two DVD layer are arranged (hereinafter referred to as "two-layer DVD"), a next generation DVD in which only one HDDVD layer is arranged (hereinafter referred to as "one layer HDDVD"); a next generation DVD in which two HDDVD layer are arranged (hereinafter referred to as "two-layer HDDVD") in addition to the above described hybrid HDDVD in which one DVD layer and one next generation HDDVD are arranged in the thickness direction.

Figure 1:
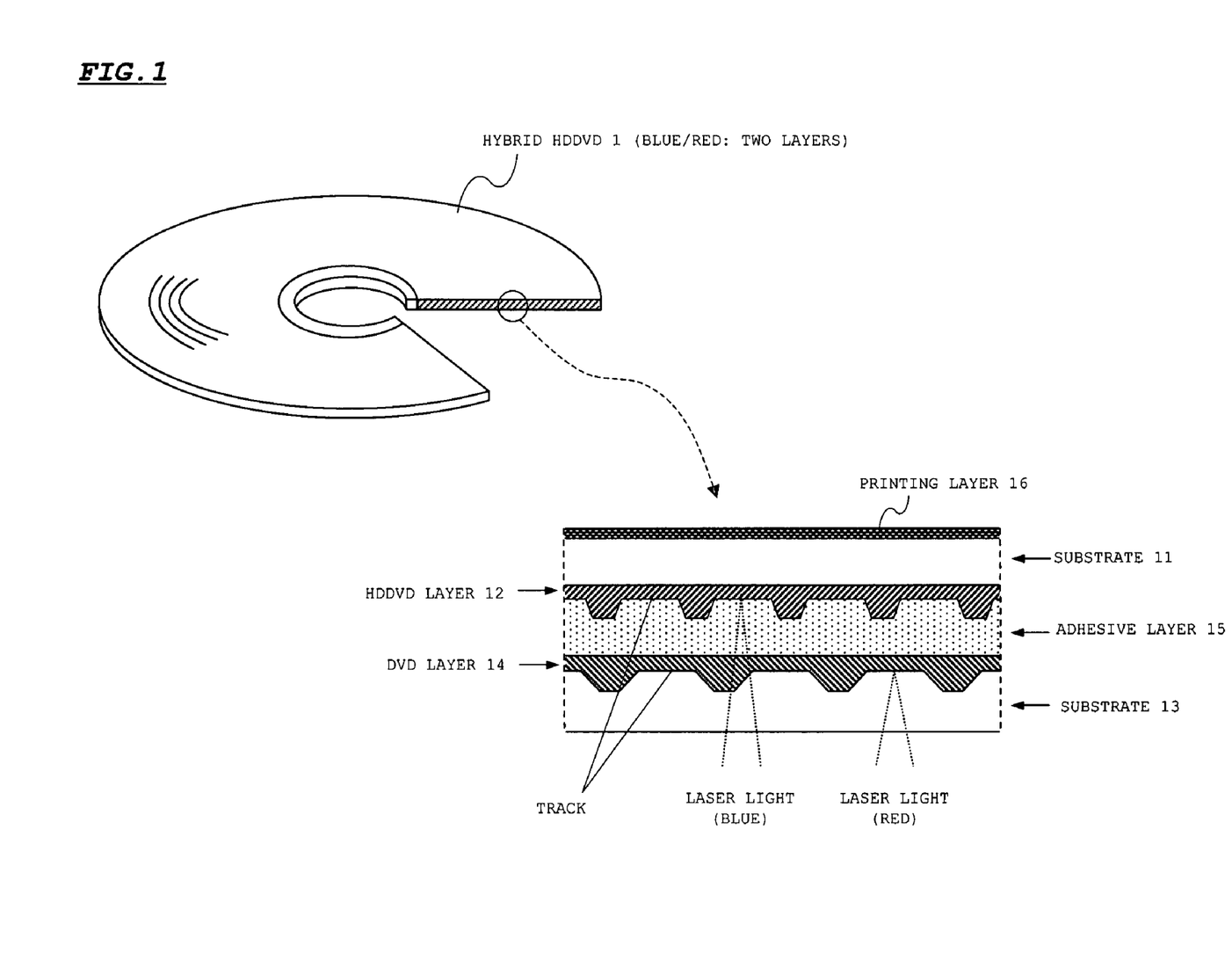
FIG. 1 is a view showing a configuration of an optical disc according to an embodiment of the present invention.

FIG. 1 shows a configuration of the hybrid HDDVD.

The hybrid HDDVD 1 has a configuration in which a substrate 11 formed with the HDDVD layer (first recording layer) 12 on one surface and a substrate 13 formed with the DVD layer (second recording layer) 14 on one surface are laminated by an adhesive layer 15, and a printing layer 16 is formed on the other surface of the substrate 11. The laser light enters from the substrate 13 side. A helical track is formed on the HDDVD layer 12 and the DVD layer 14.

The data format of the DVD layer 14 is the same as the data format of the existing DVD. Information indicating the presence of the HDDVD layer 12 is not contained in the lead-in information of the DVD layer 14. The DVD layer 14 transmits and reflects the blue laser light having a wavelength of about 405 nm and a red laser light having a wavelength of about 655 nm, respectively, at a defined ratio.

The data format complying with the next generation DVD standard is applied to the HDDVD layer 12. Information indicating the presence of the DVD layer 14 is also not contained in the lead-in information of the HDDVD layer 12. The HDDVD layer 14 is formed by a material that reflects the blue laser light at a defined reflectance, but substantially transmits all the red laser lights. Thus, the HDDVD layer 12 is not optically detected when the red laser light is used.

The two-layer DVD has a configuration in which the HDDVD layer 12 is replaced by the DVD layer in the configuration of FIG. 1. The information indicating the presence of two DVD layers is contained in the lead-in information of each DVD layer 14. The two DVD layers each transmits and reflects the red laser light having a wavelength of about 655 nm at the defined ratio. When the blue laser light having a wavelength of about 405 nm is irradiated onto the relevant disc, the two DVD layers each reflects the blue laser light at a predetermined reflectance. When the blue laser light is irradiated, detection of each DVD layer and reading of information from each DVD layer become possible by the reflected light. The configuration of the two-layer DVD and the composition of each layer etc. are already known.

The two-layer HDDVD has a configuration in which the DVD layer 14 is replaced by the HDDVD layer in the configuration of FIG. 1. In this case, the two HDDVD layers each transmits and reflects the blue laser light having a wavelength of about 405 nm at the defined ratio. When the red laser light having a wavelength of about 655 nm is irradiated onto the relevant disc, the two HDDVD layers each reflects the red laser light at a predetermined reflectance. When the red laser light is irradiated, detection of each HDDVD layer becomes possible by the reflected light. However, information cannot be appropriately read from each HDDVD layer using the red laser light since the spot size with respect to the track is large. The configuration of the two-layer HDDVD and the composition of each layer etc. are already known.

Figure 2:
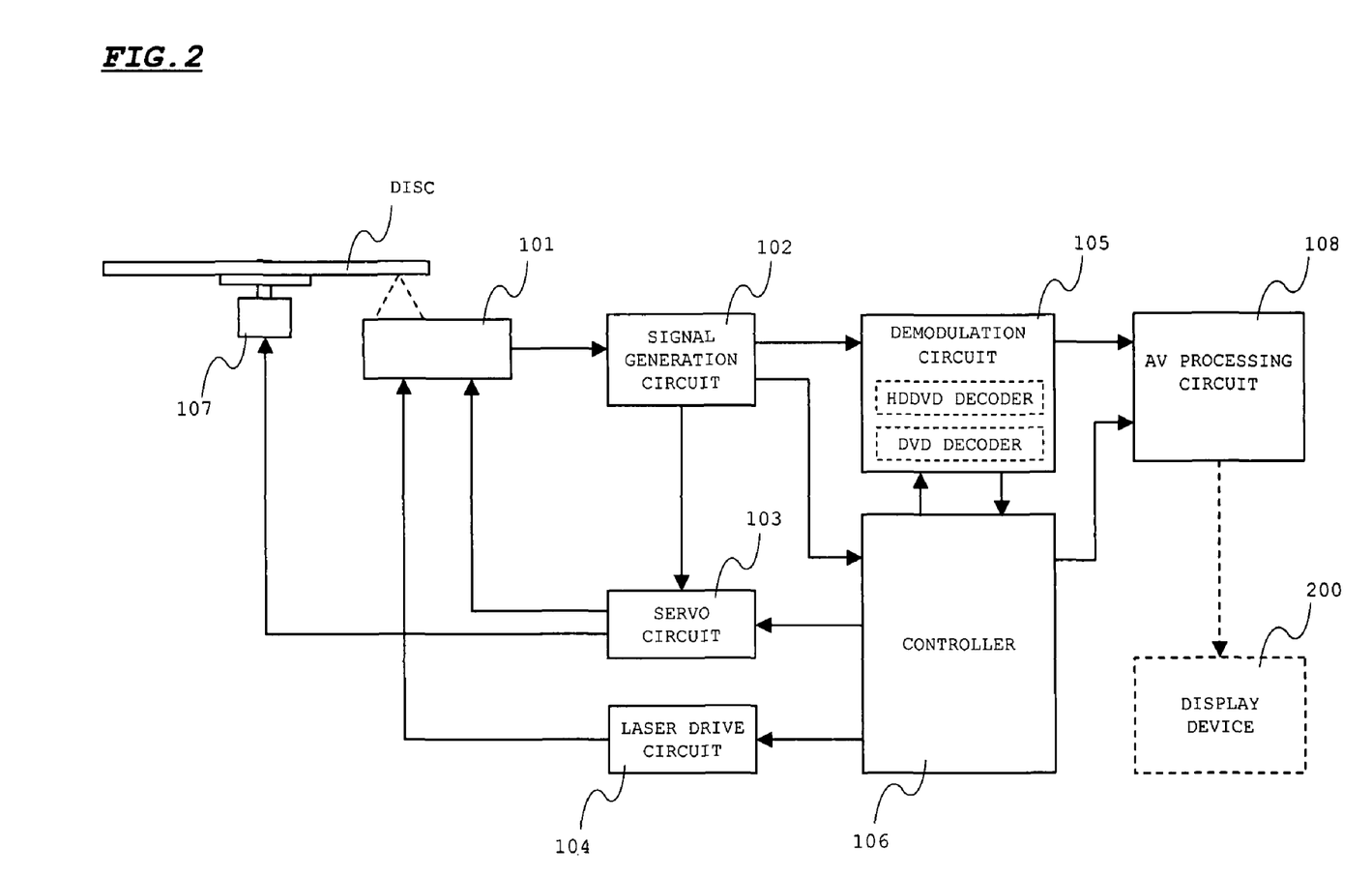
FIG. 2 is a view showing a configuration of an optical disc device according to the embodiment of the present invention.

FIG. 2 shows a configuration of the optical disc device according to the present embodiment. It should be recognized that only the blocks associated with the reproduction system are shown in the figure.

The optical disc device includes an optical pickup 101, a signal generation circuit 102, a servo circuit 103, a laser drive circuit 104, a demodulation circuit 105, a controller 106, a spindle motor 107 and an AV processing circuit 108.

The optical pickup 101 includes a semiconductor laser for exiting the blue laser light having a wavelength of about 405 nm and a red laser light having a wavelength of about 655 nm, an objective lens for converging the laser light onto the disc, an objective lens actuator for driving the objective lens in a focusing direction and a tracking direction, a photodetector for receiving the reflected light from the disc, and an optical system for guiding the laser light from the semiconductor laser to the objective lens and for guiding the reflected light from the disc to the photodetector.

The signal generation circuit 102 performs calculation process on the signal from the photodetector arranged in the optical pickup 101, generates various signals such as RF signal, focus error signal, tracking error signal and the like and outputs the signals to the corresponding circuits.

The servo circuit 103 generates a focus servo signal and a tracking servo signal based on the signal input from the signal generation circuit 102, and outputs such signals to the objective lens actuator of the optical pickup 101. The servo circuit 103 also generates a motor servo signal based on the signal input from the signal generation circuit 102 and outputs such signal to the spindle motor 107.

The laser drive circuit 104 outputs a drive signal to the semiconductor laser in the optical pickup 101 based on the control signal input from the controller 106. The light emission of the blue laser light and the light emission of the red laser light are appropriately switched according to such control.

The demodulation circuit 105 demodulates the RF signal input from the signal generation circuit 102, generates the reproducing data and outputs the data to the AV processing circuit 108. The demodulation circuit 105 includes a demodulating section (DVD decoder) for performing data demodulation according to the DVD data format and a demodulation section (HDDVD decoder) for performing data demodulation according to the next generation DVD data format. Which demodulating section to use is set based on the control signal from the controller 106. Whether or not demodulatable at each demodulating section and the sub-information such as lead-in information are output from the demodulation circuit 105 to the controller 106.

The controller 106 stores various data in a built-in memory, and controls each section according to the program set in advance.

The AV processing circuit 108 processes the reproducing data input from the demodulation circuit 105, and acquires the video information and the voice information. The video information is output to a display device 200 such as television according to the control instruction from the controller 106. The voice information is output to a speaker and the like (not shown) according to the control instruction from the controller 106.

FIG. 3 shows a process flowchart in disc determination.

When disc reproduction process starts after the disc is loaded, the semiconductor laser for exiting the red laser light (priority laser light) is lighted (S101), and drawing operation is performed on the recording layer that appears first when seen from the laser light entering side (S102). In such drawing operation, determination is made on whether or not the loaded disc is the two-layer DVD including two DVD layers (S103). If the disc is the two-layer DVD (S103: Y), reproduction process intended for the two-layer DVD is carried out.

Determination on whether or not the disc is the two-layer DVD is carried out, for example, by referencing the lead-in information of when demodulating the first recording layer with the DVD decoder. That is, the controller 106 determines the loaded disc as the two-layer DVD when the lead-in information of the first recording layer can be demodulated with the DVD decoder, and the information indicating the presence of two DVD layers is contained in the demodulated lead-in information.

In S103, if the loaded disc is not the two-layer DVD, determination is made on whether or not the first recording layer is readable as DVD (decodable with DVD encoder) (S104), and if not readable (S104: NG), the relevant disc is determined as either the one layer HDDVD or the two-layer HDDVD. Reproduction process intended for such discs is then carried out. Here, the laser light is switched to the blue laser light.

If the first recording layer is decodable with the DVD layer (S104: OK), reproducing operation on the recording layer is executed, and a menu screen for selecting the chapter or the reproducing language and the like is displayed based on the acquired content information (S105). When the relevant display is carried out, the controller 106 temporarily interrupts the reproducing operation on the relevant recording layer to wait for the user input on the display screen.

The controller 106 switches the light emitting laser from the red laser light to the blue laser light according to the interruption (S106). A focus search to search for whether or not a second recording layer is present at the back of the first recording layer is executed (S107). In focus search, if the second recording layer (HDDVD layer) is detected at the back of the first recording layer, the display notifying the user that the second recording layer (HDDVD layer) can be selected is added to the menu screen displayed in S105 (S109).

The focus search in S107 is performed, for example, by monitoring an S curve produced on the focus error signal when displacing the objective lens of the optical pickup 101 in the focusing direction. For instance, if the S curve indicating another recording layer is further detected after the S curve indicating the first recording layer, the presence of the second recording layer (HDDVD layer) is detected (S109).

If the second recording layer is not detected in S108, S109 is skipped, and the screen displayed in S105 is continuously displayed.

When the search and the display processes for the second recording layer are terminated, a waiting state is achieved until an operation is performed on the display screen (S110). When the operation input is made by the user, the reproducing operation is performed according to the relevant operation. That is, when the operation input according to the menu screen is made, reproducing operation intended for the first recording layer (DVD layer) is carried out.

If, on the other hand, the operation input for reproducing the second recording layer (HDDVD layer) is made, the object to be reproduced is switched to the second recording layer (HDDVD layer). If the blue laser light used for the focus search in S107 is still emitting light, a smooth transition to the reproducing operation on the second recording layer (HDDVD layer) is achieved.

In the present embodiment, the search and display of the second recording layer are uniformly performed during the interruption of reproduction that occurs when displaying the menu screen, but is not limited to when displaying the menu screen, and search and display of the second recording layer may be performed when an available time is produced in the reproducing operation of the first recording layer such as during pause of reproduction and the like.

FIG. 4 shows a process flowchart of such case.

The processes of S101 to S104 are the same as the above. If the first recording layer is readable (decodable with DVD decoder) as the DVD in S104 (S104: OK), the process continues until an available time is set in the reproducing operation on the relevant recording layer (S121: N). When the available time is set in the reproducing operation (S121: Y), the controller 106 switches the light emitting laser from the red laser to the blue laser (S122), and subsequently, executes the focus search to search for the presence of the second recording layer at the back of the first recording layer (S123).

In focus search, if the second recording layer (HDDVD layer) is detected at the back of the relevant recording layer (S124: Y), the controller 106 displays the display over the current screen display to notify the user that the second recording layer (HDDVD layer) can be selected. If the second recording layer (HDDVD layer) is not detected (S124: N), the process returns to S120, and reproducing operation of the first recording layer is continued.

When the display notifying that the second recording layer (HDDVD layer) can be selected is displayed in S125, determination is made on whether or not the input has been made by the user who has received the display to select the second recording layer (HDDVD layer) until the available time is terminated (S126, S127). If the operation input to reproduce the second recording layer (HDDVD layer) is made within the available time (S127: Y), the object to be reproduced is switched to the second recording layer (HDDVD layer). If the operation input to reproduce the second recording layer (HDDVD layer) is not made within the available time (S126: Y), the process returns to S120, and reproducing operation of the first recording layer is continued.

If the available time is terminated (e.g., pause is released etc.) before the search and display of the second layer are terminated, the process immediately returns to the reproducing operation on the first recording layer. Alternatively, if the search and the display of the second layer are not terminated even after the available time is terminated, the display may continue for only a certain time (extra time for selecting the HDDVD layer) after performing the above processes, and the process may then return to the reproducing operation on the first recording layer if the instruction to select the HDDVD layer is still not made.

The flowchart shown in FIG. 4 is provided for performing search and display of the second recording layer every time the available time is produced in the reproducing operation, but the search and display may not be performed again once the search and display are appropriately performed even if the available time is produced in the reproducing operation.

FIG. 5 is a process flowchart for such case. Here, the step of S130 is newly added. Other processes are the same as FIG. 4.

That is, the processes of S122 to S127 are performed, and when search and display of the second recording layer are appropriately performed, the processes of S122 to S127 are not performed again even if the available time is produced in the reproducing operation (S121: Y), and the reproduction of the first recording layer is continued (S130: Y→S120).

In addition, although drawing is performed on the first recording layer (first layer) (S102), determination is made on whether or not the loaded disc is the two-layer DVD (S103) and determination is made on whether or not the first recording layer is readable as DVD (decodable with DVD encoder) (S104) if the disc is not the two-layer DVD in the above embodiment, after performing drawing on the first recording layer (S102), determination may be made on whether or not the first recording layer is readable (decodable) as DVD (S201), and if readable, determination may be made on whether or not the loaded disc is the two-layer DVD based on the lead-in information of the first recording layer (S202), as shown in FIG. 6, FIG. 7, FIG. 8.

FIG. 6, FIG. 7, and FIG. 8 each corresponds to FIG. 3, FIG. 4, and FIG. 5 but with S103 and S104 changed to S201 and S202.

According to the above described embodiment, rapid transition to the reproducing operation becomes possible when the loaded disc is the one layer DVD or the hybrid HDDVD by setting the red laser light as the priority laser light. Further, user is smoothly notified of the fact that the HDDVD layer is arranged as the second recording layer when the loaded disc is the hybrid HDDVD. Thus, the user is able to smoothly transition to the reproducing operation on the HDDVD layer, as necessary.

The embodiment of the present invention is not limited to the above embodiments. For instance, notification to the user may be carried out by voice in addition to overlapping the displays on the display screen. Various modifications may be appropriately made on the present invention without departing from the scope of the technical idea described in the appended claims.

What is claimed is:

1. An optical disc device configured for reproducing recorded information from a two-wavelength two-layer disc comprising a first recording layer corresponding to a first laser light of a first wavelength and a second recording layer corresponding to a second laser light of a second wavelength longer than the first wavelength, the second and first recording layers being arranged from a laser light entering side in that order, and the first recording layer being not optically detected when the second laser light is used; the optical disc device comprising:

an optical pickup for irradiating a disc loaded on the optical disc device with selected one of the first laser light and the second laser light;

a laser drive circuit for providing a driving signal to the optical pickup for irradiating the disc with the selected one of the first laser light and the second laser light;

a reproduction circuit for reproducing a signal from the optical pickup;

an output circuit for generating an output signal to provide predetermined information to a user; and a control circuit for controlling the laser drive circuit, the reproduction circuit, and the output circuit, wherein the control circuit is configured to:

perform, when a disc is loaded on the optical disc device, a first detection process of irradiating the disc with the second laser light to determine whether the disc has only one recording layer optically detectable with the second laser light;

when it is determined that the disc has only one recording layer optically detectable with the second laser light, automatically proceed with a reproduction process for that recording layer with the second laser light;

during the reproduction process for that recording layer with the second laser light, perform, when it is possible, a second detection process of irradiating the disc with the first laser light to detect the first recording layer of the two-wavelength two-layer disc; and when the first recording layer is detected, perform a notification process of controlling the output circuit to notify the user that the disc has the first recording layer.

2. The optical disc device according to claim 1, wherein the control circuit performs, responsive to an instruction to reproduce recorded information from the first recording layer, a selection process of selecting the first recording layer to reproduce the recorded information from the first recording layer.

3. A reproducing method for an optical disc device configured for reproducing recorded information from a two-wavelength two-layer disc comprising a first recording layer corresponding to a first laser light of a first wavelength and a second recording layer corresponding to a second laser light of a second wavelength longer than the first wavelength, the second and first recording layers being arranged from a laser light entering side in that order, and the first recording layer being not optically detected when the second laser light is used; the method comprising the steps of:

when a disc is loaded on the optical disc device, irradiating the disc with the second laser light to determine whether the disc has only one recording layer optically detectable with the second laser light;

when it is determined that the disc has only one recording layer optically detectable with the second laser light, automatically proceeding with a reproduction process for that recording layer with the second laser light;

during the reproduction process for that recording layer with the second laser light, irradiating, when it is possible, the disc with the first laser light to detect the first recording layer of the two-wavelength two-layer disc; and when the first recording layer is detected, notifying the user that the disc has the first recording layer.

4. The reproducing method according to claim 3, further comprising the step of selecting the first recording layer to reproduce recorded information from the first recording layer responsive to an instruction to reproduce the recorded information from the first recording layer.

5. A reproducing method for an optical disc device configured for reproducing recorded information from a two-wavelength two-layer disc comprising a first recording layer corresponding to a first laser light of a first wavelength and a second recording layer corresponding to a second laser light of a second wavelength longer than the first wavelength, the second and first recording layers being arranged from a laser light entering side in that order, and the first recording layer being not optically detected when the second laser light is used; the method comprising the steps of:

when a disc is loaded on the optical disc device, irradiating the disc with the second laser light to determine whether the disc has only one recording layer optically detectable with the second laser light;

when it is determined that the disc has only one recording layer optically detectable with the second laser light, automatically proceeding with a reproduction process of attempting to reproduce recorded information from that recording layer with the second laser light;

when the attempt to reproduce the recorded information from that recording layer is successful, continuing the reproduction process for that recording layer;

during the reproduction process for that recording layer with the second laser light, irradiating, when it is possible, the disc with the first laser light to detect the first recording layer of the two-wavelength two-layer disc; and when the first recording layer is detected, notifying the user that the disc has the first recording layer.

6. The disc reproducing method according to claim 5, further comprising the step of selecting the first recording layer to reproduce recorded information from the first recording layer responsive to an instruction to reproduce the recorded information from the first recording layer.

* * * * *